United States Patent
Conlon et al.

(10) Patent No.: US 11,212,399 B1
(45) Date of Patent: Dec. 28, 2021

(54) MULTI-FUNCTION DEVICE WITH GRAMMAR-BASED WORKFLOW SEARCH

(71) Applicant: Xerox Corporation, Norwalk, CT (US)

(72) Inventors: Paul Roberts Conlon, South Bristol, NY (US); Eliud Robles Flores, Rochester, NY (US); Lee C. Moore, Penfield, NY (US); David C. Craig, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/127,442

(22) Filed: Dec. 18, 2020

(51) Int. Cl.
*H04N 1/00* (2006.01)
*H04N 1/327* (2006.01)

(52) U.S. Cl.
CPC ....... *H04N 1/00403* (2013.01); *H04N 1/0097* (2013.01); *H04N 1/3278* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,657,831 B2 * | 2/2010 | Donahue | G06Q 10/00 715/234 |
| 9,235,616 B2 | 1/2016 | Wu et al. | |
| 10,462,237 B1 * | 10/2019 | Karppanen | G06F 16/9562 |
| 2011/0035671 A1 * | 2/2011 | Iwai | H04N 1/00347 715/728 |
| 2014/0304027 A1 | 10/2014 | Wu et al. | |
| 2018/0341685 A1 * | 11/2018 | Indyk | G06F 16/00 |
| 2019/0155913 A1 * | 5/2019 | Singal | G06F 16/3344 |
| 2020/0402508 A1 * | 12/2020 | Thomas | H04N 1/00403 |

* cited by examiner

*Primary Examiner* — Haris Sabah

(57) ABSTRACT

A method is disclosed. For example, the method executed by a processor of a multi-function device (MFD) includes receiving a grammar-based voice search for a workflow, processing the grammar-based voice search into normalized terms associated with the MFD, searching for workflows that match the normalized terms from the grammar-based voice search, and displaying matching workflows in a sorted order on a user interface of the MFD.

20 Claims, 5 Drawing Sheets

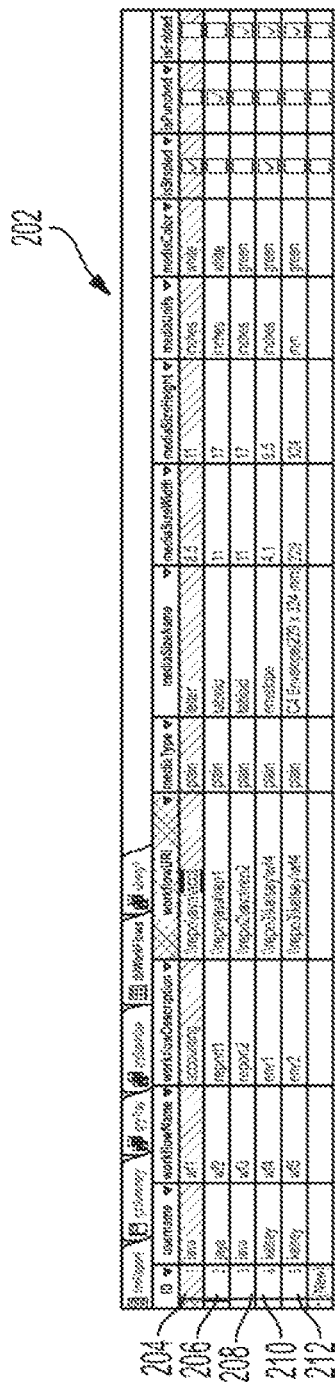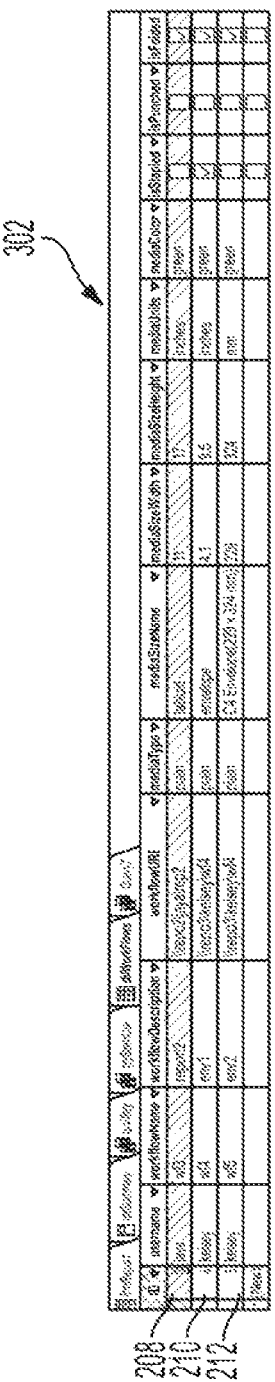
FIG. 2
FIG. 3

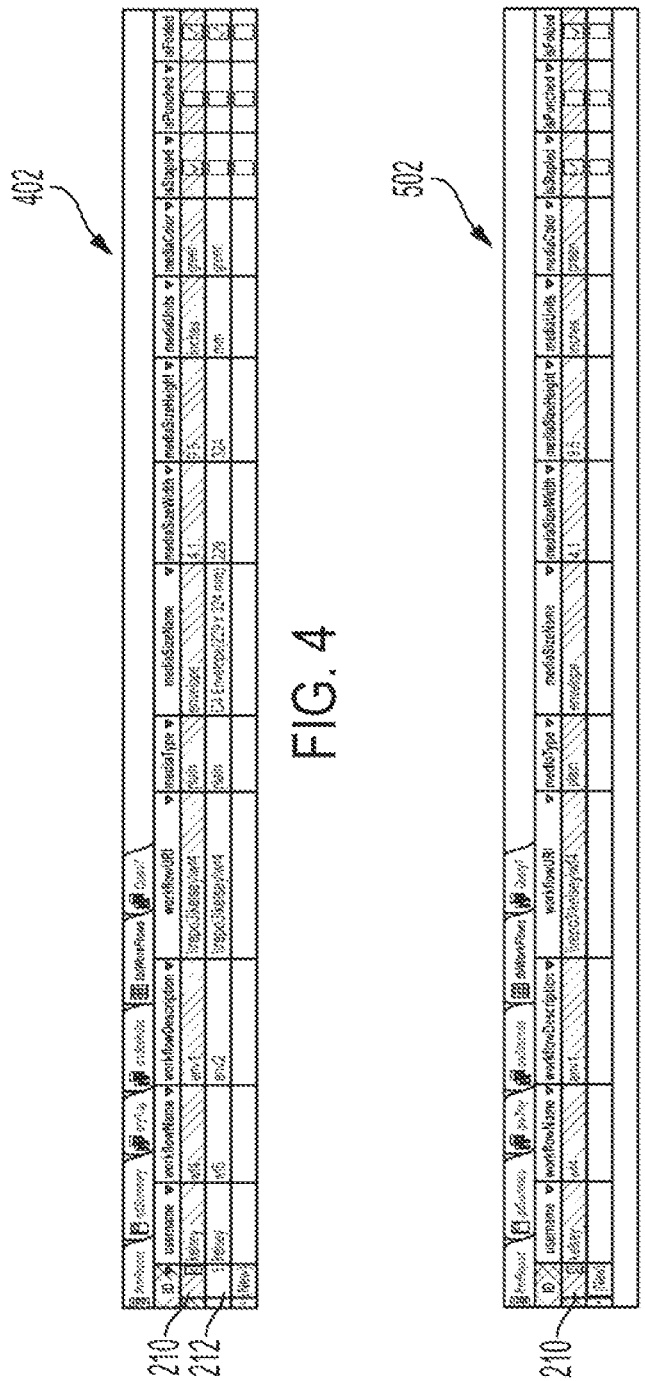

MULTI-FUNCTION DEVICE WITH GRAMMAR-BASED WORKFLOW SEARCH

The present disclosure relates generally to multi-function devices (MFDs), and relates more particularly to MFDs with a grammar-based workflow search.

BACKGROUND

Multi-function devices (MFDs) are used to process print jobs. An MFD can perform a variety of different functions including printing, scanning, copying, faxing, and the like.

Some MFDs can provide an ability for users to create workflows. Workflows may be custom settings and/or operational parameters that can be saved by a user for future use. Thus, when a user uses the same settings and operational parameters frequently, the user can create and save a workflow. The user may then simply select the workflow each time the user wants to execute a particular job, and the settings and operational parameters may be automatically selected and/or populated.

However, in a large office setting, hundreds of different users may use the same MFD. Each user may create several workflows. As a result, the MFD may store thousands of workflows. Navigating the workflows to find a particular workflow may be difficult.

SUMMARY

According to aspects illustrated herein, there are provided a method and a non-transitory computer readable medium for executing a maintenance routine based on a defect class associated with a machine state. One disclosed feature of the embodiments is a method, executed by a processor of the MFD, that comprises receiving a grammar-based voice search for a workflow, processing the grammar-based voice search into normalized terms associated with the MFD, searching for workflows that match the normalized terms from the grammar-based voice search, and displaying matching workflows in a sorted order on a user interface of the MFD.

Another disclosed feature of the embodiments is a non-transitory computer-readable medium having stored thereon a plurality of instructions, the plurality of instructions including instructions which, when executed by a processor, cause the processor to perform operations to receive a grammar-based voice search for a workflow, process the grammar-based voice search into normalized terms associated with the MFD, search for workflows that match the normalized terms from the grammar-based voice search, and display matching workflows in a sorted order on a user interface of the MFD.

BRIEF DESCRIPTION OF THE DRAWINGS

The teaching of the present disclosure can be readily understood by considering the following detailed description in conjunction with the accompanying drawings, in which:

FIG. 2 illustrates an example screenshot of a grammar-based workflow search result of the present disclosure;

FIG. 3 illustrates another example screenshot of a grammar-based workflow search result of the present disclosure;

FIG. 4 illustrates another example screenshot of a grammar-based workflow search result of the present disclosure;

FIG. 5 illustrates another example screenshot of a grammar-based workflow search result of the present disclosure;

To facilitate understanding, identical reference numerals have been used, where possible, to designate identical elements that are common to the figures.

DETAILED DESCRIPTION

The present disclosure broadly discloses a method and apparatus to perform grammar-based workflow searches on an MFD. As discussed above, some MFDs can provide an ability for users to create workflows. Workflows may be custom settings and/or operational parameters that can be saved by a user for future use. Thus, when a user uses the same settings and operational parameters frequently, the user can create and save a workflow. The user may then simply select the workflow each time the user wants to execute a particular job, and the settings and operational parameters may be automatically selected and/or populated.

However, in a large office setting, hundreds of different users may use the same MFD. Each user may create several workflows. As a result, the MFD may store thousands of workflows. Navigating the workflows to find a particular workflow may be difficult.

For example, workflows may be saved with unique names provided by the user. The user may not remember what name certain workflows were saved with. In addition, the user interface may not show the settings or operational parameters associated with a particular workflow. Thus, the user may simply create a new workflow, which causes the number of saved workflows to increase, and further complicates the ability to find a desired workflow.

The present disclosure uses a grammar-based workflow search on the MFD to efficiently and quickly find desired workflows. In one embodiment, the user may use voice commands to search for a desired workflow by name. If the name is unknown, the user may use voice commands to narrow the search down by desired features. The user interface may present workflows that match the features that are requested via the grammar-based search.

In one embodiment, the results may be presented in the user interface in a sorted order. For example, the results may be sorted based on frequency, based on those created by the user logged into the MFD, based on those associated with a department of the user, and the like.

In one embodiment, the present disclosure may pre-process the grammar that is spoken before analyzing the grammar for execution. For example, a voice recognition module may normalize grammar that is spoken to the MFD to terms that are associated with MFD operations and/or settings. In addition, workflows that are saved in different formats may be normalized into a canonical format that would allow the grammar based search to return results across all formats of saved workflows in the MFD or stored in the cloud.

Figure 1:
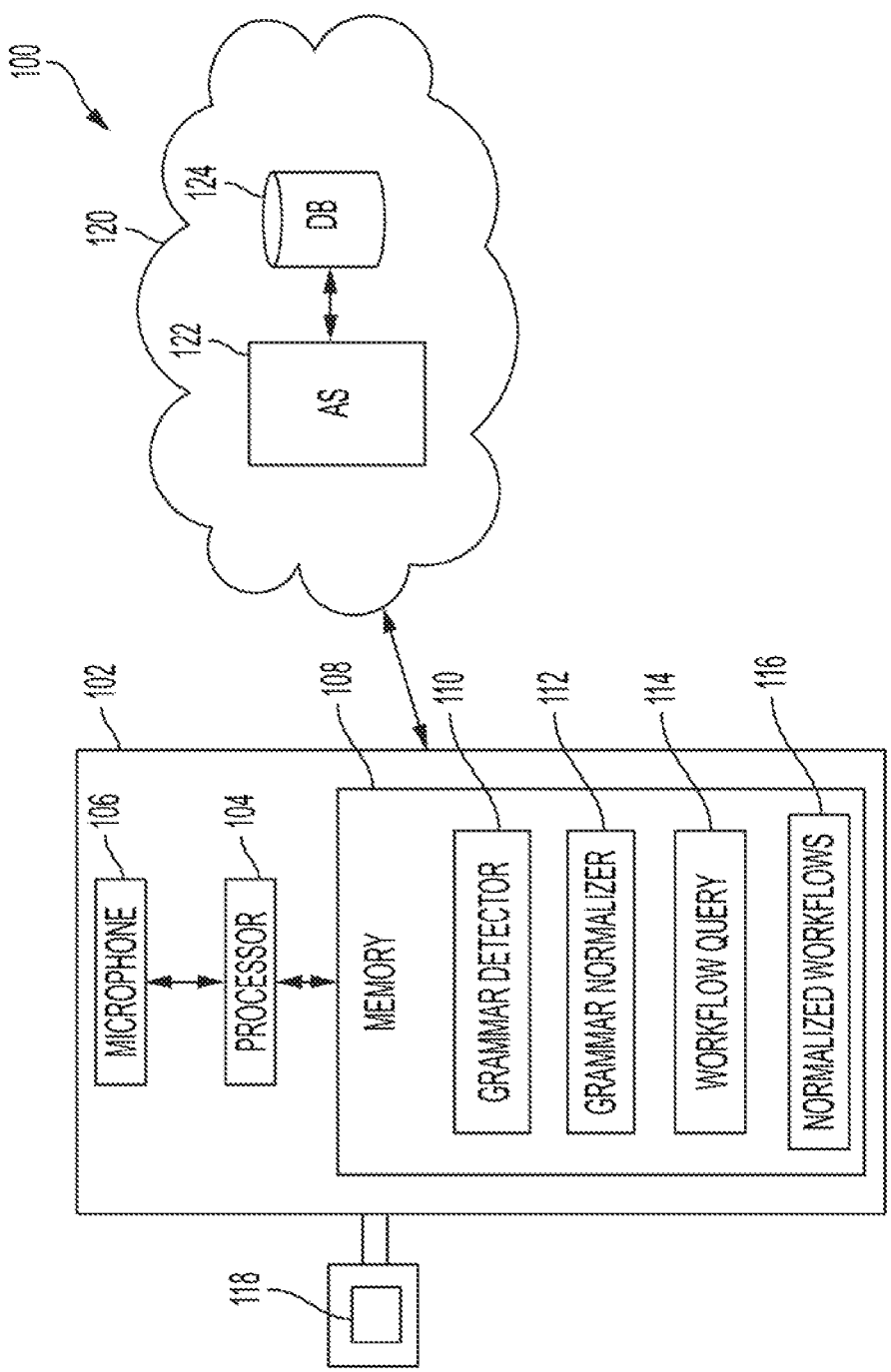
FIG. 1 illustrates a block diagram of an example network with an MFD of the present disclosure.

FIG. 1 illustrates an example network 100 of the present disclosure. In one embodiment, the network 100 may include an MFD 102 and an Internet Protocol (IP) network 120. Although a single MFD 102 is illustrated in FIG. 1, it should be noted that a plurality of MFDs 102 located remotely from one another at different geographic locations may be deployed and communicatively coupled to the IP network 120.

It should also be noted that the IP network 120 has been simplified for ease of explanation and may include additional components that are not shown. For example, the IP network 120 may include additional access networks, gateways, firewalls, access points, and the like.

In one embodiment, the MFD 102 may include a processor 104, a memory 108, a microphone 106, and a user interface 118. The processor 104 may be communicatively coupled to the memory 108, the microphone 106, and the user interface 118. The processor 104 may receive voice inputs (e.g., grammar-based search terms) from the microphone 106. The processor 104 may control operation of the user interface 118. The processor 104 may also execute instructions stored in the memory 108 to perform the functions described herein.

It should be noted that the MFD 102 has been simplified for ease of explanation and may include additional components that are not shown. For example, the MFD 102 may include a paper tray, print heads, a toner cartridge, a paper path, one or more finishing modules, and the like.

In one embodiment, the user interface 118 may be a touch screen graphical user interface (GUI). In one embodiment, the user interface 118 may be a display with physical buttons to navigate various menus shown on the display. The user interface 118 may be used to create and save workflows, select printing options and/or parameters, find workflows to execute a job, and the like.

In one embodiment, the workflows may be custom jobs that are created by a user. The workflows may include saved settings and/or operational parameters for a print job, a scanning job, emailing a document, and the like. The workflows may be selected via the user interface 118, and the settings and/or operational parameters may be automatically selected and/or values may be automatically populated.

However, as noted above, many different users may create many different workflows. As a result, looking for a particular workflow may be difficult and/or inefficient using the user interface 118. For example, the user may not remember the name of the workflow. In addition, the current navigation menus for workflows may not show the various settings and/or parameters associated with a particular workflow.

In one embodiment of the present disclosure, a user may perform a grammar-based workflow search by providing voice inputs captured by the microphone 106. The processor 104 may analyze and process the voice inputs to then perform a query on workflows that are saved in the local memory 108 or workflows that are saved in a database (DB) 124 in the IP network 120. In other words, the grammar-based workflow search may be performed locally, or provided to an application server (AS) 122 in the IP network 120 and performed by the AS 122 over the IP network 120.

In one embodiment, the memory 108 may include a grammar detector 110, a grammar normalizer 112, a workflow query 114, and normalized workflows 116. In one embodiment, the grammar detector 110, the grammar normalizer 112, the workflow query 114, and the normalized workflows 116 may also be saved in the DB 124 that is communicatively coupled to the AS 122 if the grammar-based search is performed over the IP network 120.

In one embodiment, the grammar detector 110 may be a voice recognition module. For example, the grammar detector 110 may be a specialized application specific integrated circuit (ASIC) processor that is programmed to perform voice recognition. In one embodiment, the grammar detector 110 may be instructions executed by the processor 104 to perform voice recognition. The grammar detector 110 may be artificial intelligence (AI) enabled voice recognition.

In one embodiment, the grammar detector 110 may be trained to identify words that are associated with the MFD 102. For example, words and/or phrases that are associated with settings, operations, parameters, and the like, for performing jobs on the MFD 102 may be recognized by the grammar detector 110. The words may include "staple and fold", "eight and half by eleven", "black and white", "copies", "scan", "double-sided copies", colors (e.g., black, green, yellow, and the like), numbers, and the like.

In one embodiment, the grammar normalizer 112 may process the grammar parsed by the grammar detector 110. For example, the grammar normalizer 112 may then "clean" and/or correct the grammar and normalize certain terms that are associated with the MFD 102. For example, the media size may be spoken in several different ways. For example, one user may say "eight and a half by eleven." Another user may say "eight point five cross eleven". Yet another user may say "eight and half inches ex eleven inches". The grammar detector 110 may detect all of the phrases as being associated with the MFD 102. However, the grammar normalizer 112 may normalize all of the different phrases as "8.5×11".

In addition, the grammar normalizer 112 may correct incorrectly captured words from the grammar detector 110. For example, a user may say "staple and fold". However, the grammar detector 110 may interpret the audio as "staple unfold". The grammar normalizer 112 may recognize that there is no "unfold" operation and correct the grammar input as "staple and fold".

In one embodiment, the grammar detector 110 and the grammar normalizer 112 may be trained for speech associated with a particular region. For example, different countries and different regions of countries may have different accents or different ways of describing certain job settings and/or operation parameters. The grammar detector 110 and the grammar normalizer 112 may be trained to detect words and/or phrases associated with the MFD 102 as they would be spoken in a particular country or region.

In one embodiment, the workflow query 114 may generate a query based on the normalized grammar detected from the voice input captured by the microphone 106. For example, a user may state "find jobs saved by John Smith that are printed on green eight and half by eleven paper with staples." The grammar detector 110 may identify the words or phrases "saved by John Smith," "printed on green," "eight and half by eleven paper," and "staples". The grammar normalizer 112 may normalize the phrase "printed on green" to be "green colored media" and the phrase "eight and half by eleven paper" to be "8.5×11 media size." The workflow query 114 may then generate a query to search for author=John Smith, media color=green, media size=8.5×11, and staple finishing option=true.

In one embodiment, the workflow query 114 may search the normalized workflows 116 that match the values of the query generated by the workflow query 114. In one embodiment, the normalized workflows 116 may generate a canonical form for the settings and/or operational parameters of workflows saved in different file formats. For example, workflows can be saved in a variety of different formats that use different terms. For example, workflows can be saved as internet print protocol (IPP) files, extensible mark-up language (XML) files, and the like. The different file formats may use different terms for different settings. For example, some formats may use a label of "userID" for an author and another format may use a label of "user" for an author. Some formats may use a label of "mediatype" for the paper type and another format may use a label of "papertype" for the paper type, and so forth.

Thus, in one embodiment, all of the saved workflows may be normalized. The workflows may be normalized by tagging existing workflows with a common or canonical term for each parameter. In one embodiment, the existing workflows may be converted and saved into a new file that uses the common or canonical term for each parameter.

A number of normalized workflows may be found that match the query generated by the workflow query 114. The matching workflows may be shown in the user interface 118. The matching workflows may be presented in a sorted order. For example, the sorted order may be a default sorting based on a frequency of use, a frequency of use and a user identification that is logged into the MFD, a frequency of use and a department associated with the user, a frequency of use on a particular MFD 102 (e.g., different MFDs 102 at different locations and/or departments may have different frequencies of use of the workflows), and the like.

In one embodiment, the user may select one of the workflows that are presented in the user interface 118. In another embodiment, the user may continue narrowing down the matching workflows by providing additional grammar-based search terms that are captured by the microphone 106. For example, the user may continue to narrow down the matching results using voice commands until there is a single matching workflow presented in the user interface 118. The user may then select the workflow to execute the job. When the workflow is selected, the appropriate settings and setting values may be automatically selected and/or populated in the various menus of the user interface 118 to execute the job in accordance with the workflow.

FIGS. 2-5 illustrate different screenshots that may be presented in the user interface 118 in response to the workflow query 114 being executed. It should be noted that the screenshots illustrated in FIGS. 2-5 are presented as examples. The screenshots may be formatted differently and/or use different column names for a particular application.

FIG. 2 illustrates an example after an initial grammar-based search is captured by the microphone 106. For example, a user may log into the MFD 102 and begin a grammar-based workflow search. The user may wake the grammar detector 110 by starting with an activation word. For example, the activation word may be a name or a key word (e.g., "Begin Workflow Search").

In one embodiment, the user may say "show me all jobs with plain paper". Thus, the grammar detector 110 would analyze the audio recorded by the microphone 106 and detect the words "plain paper" associated with the MFD 102. The grammar normalizer 112 may normalize the term "paper" to "media." The workflow query 114 may generate a query to find jobs that use plain media in the stored normalized workflows 116. The matching workflows 204, 206, 208, 210, and 212 may be found and presented in a screenshot 202 as illustrated in FIG. 2.

It should be noted that the number of matching workflows is reduced for ease of explanation. However, when deployed, several hundred workflows may be presented over several pages that can be scrolled through the user interface 118. Thus, additional grammar search terms may be spoken to further narrow the matching workflows until a single workflow or a small number of workflows (e.g., 3 or 5) are presented.

The user may see the screenshot 202 and want to further narrow down the matching queries. The user may speak additional grammar-based workflow search terms. For example, the user may say "give me all workflows that user green paper." The grammar detector 110, the grammar normalizer 112, and the workflow query 114 may analyze the captured audio, as described above, and perform an additional query on the matching queries 204, 206, 208, 210, and 212. In other words, when matching query results are shown in the user interface 118, additional grammar-based workflow search terms that are spoken may cause the workflow query 114 to query the matching workflows shown in the screenshot 202 and not the normalized workflows 116 that are saved in the memory 108.

In response, a screenshot 302 may be shown in the user interface 118. For example, the matching workflows may be narrowed down to those that use green paper. For example, the matching workflows 204 and 206 may be removed. The matching workflows 208, 210, and 212 may be shown in the screenshot 302.

The user may see the screenshot 302 and want to further narrow down the matching queries. The user may speak additional grammar-based workflow search terms. For example, the user may say "give me all workflows by Kelsey that are folded." The grammar detector 110, the grammar normalizer 112, and the workflow query 114 may analyze the captured audio, as described above, and perform an additional query on the matching queries 208, 210, and 212.

In response, a screenshot 402 may be shown in the user interface 118. For example, the matching workflows may be narrowed down to those workflows created by Kelsey that use green colored plain media, and are folded. For example, the matching workflow 208 may be removed. The matching workflows 210 and 212 may be shown in the screenshot 402.

The user may see the screenshot 402 and want to further narrow down the matching queries. The user may speak additional grammar-based workflow search terms. For example, the user may say "give me all workflows that have the word accounting in their free-form text description." The grammar detector 110, the grammar normalizer 112, and the workflow query 114 may analyze the captured audio, as described above, and perform an additional query on the matching queries 210 and 212.

In response, a screenshot 502 may be shown in the user interface 118. For example, the matching workflows may be narrowed down to those workflows created by Kelsey that use green colored plain media, are folded, and include the term "accounting" in the workflow description. For example, the matching workflow 210 may be removed. The matching workflow 212 may be shown in the screenshot 502.

After the user selects the matching workflow 212, the matching workflows may be cleared from the user interface 118. Thus, a subsequent grammar-based workflow search may cause the workflow query 114 to generate a query and search the normalized workflows 116 again. In one embodiment, the user may state a command such as "start over" or "clear search" to clear the matching workflows presented in the user interface 118 and cause the workflow query 114 to search the normalized workflows 116 again.

Thus, the MFD 102 of the present disclosure may be modified to provide a microphone 106 that can capture voice input. The voice input may include grammar-based workflow search commands to search for workflows stored in the MFD 102 locally, or stored remotely in the DB 124 in the IP network 120. The user may continue to provide grammar-based workflow search commands to further narrow down the number of matching workflows that is presented until the user finds the desired workflow or a single workflow is presented in the user interface 118.

Figure 6:
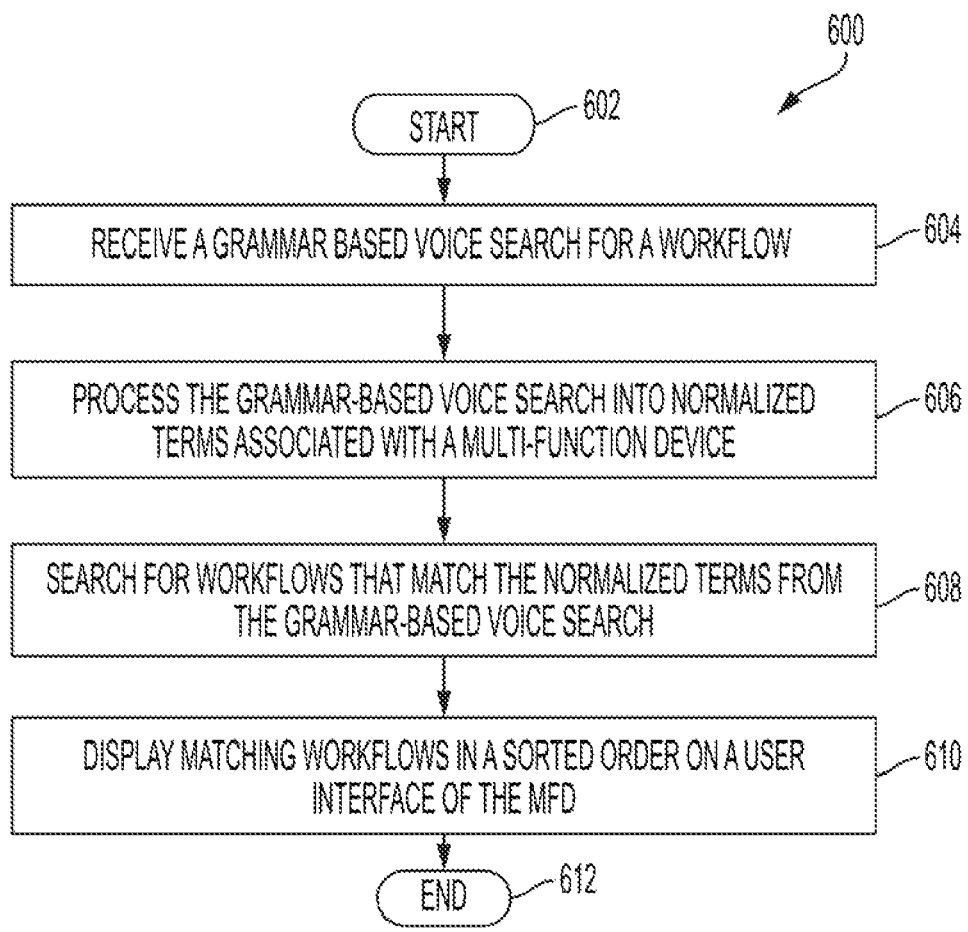
FIG. 6 illustrates a flow chart of a method of performing a grammar-based workflow search on a multi-function device of the present disclosure.

FIG. 6 illustrates an example flow chart of a method 600 for performing a grammar-based workflow search on a multi-function device of the present disclosure. In one embodiment, the method 600 may be performed by the MFD 102 or by an apparatus, such as the apparatus 700 illustrated in FIG. 7 and discussed below.

In one embodiment, the method 600 begins at block 602. At block 604, the method 600 receives a grammar-based voice search for a workflow. For example, a user may log into an MFD and search for a workflow to execute a job. The job may be copy job, a print job, a scanning job, and the like.

In one embodiment, the MFD may use voice commands to search for a particular workflow. Thus, a user does not need to navigate through several pages of previously saved workflows. In addition, minimal changes can be made to the user interface. Rather, the user interface may simply present the matching workflows in response to the grammar-based voice search, as described below.

At block 606, the method 600 may process the grammar-based voice search into normalized terms associated with the MFD. In one embodiment, the grammar-based voice search may be processed by identifying words and/or phrases that are associated with the MFD. Then, the identified words and/or phrases may be normalized into a form that is used by a query engine.

For example, different people may say the size of the media in different forms. Some may say "eight and a half by eleven," while others may say "eight point five cross eleven." These terms may be normalized as "8.5×11" for the query engine. After the terms are identified and normalized, a query engine may generate a query to search for workflows that include the normalized words and/or phrases parsed from the grammar-based voice search.

At block 608, the method 600 searches for workflows that match the normalized terms from the grammar-based voice search. In one embodiment, the workflows that are searched may be workflows that are converted into a normalized format. The workflows may be generated and saved as different file formats (e.g., IPP, XML, proprietary print driver tickets, and the like). The normalized format may convert the various terms that can be used for different parameters and/or settings of a workflow saved in these different formats into canonical terms for each parameter and/or setting of a workflow.

In one embodiment, the normalized workflows may be saved locally on the MFD. In another embodiment, the normalized workflows may be stored in a database located remotely. The database may be reached by the MFD via an IP network connection.

At block 610, the method 600 displays matching workflows in a sorted order on a user interface of the MFD. After the query is run and the matching workflows are found, the matching workflows may be presented in a sorted order in the user interface. The sorted order may be based on a frequency of use. In one embodiment, the sorted order may be based on a frequency of use and an identification of the user who is logged into the MFD, or a particular department associated with the user, and so forth.

In one embodiment, if there are a large number of matching workflows, the user may continue to provide grammar-based workflow search terms. The additional grammar-based workflow search terms that are provided may be processed to generate a query. The query may be run against the matching workflows that were presented in block 610 rather than searching the entire database of normalized workflows. As a result, the search may be more efficient in narrowing down the number of matching workflows. In response, a reduced number of matching workflows may be presented in the user interface. The process may be repeated until the user finds the desired workflow, a single workflow is displayed in the user interface, or the search is canceled by the user. At block 612, the method 600 ends.

Figure 7:
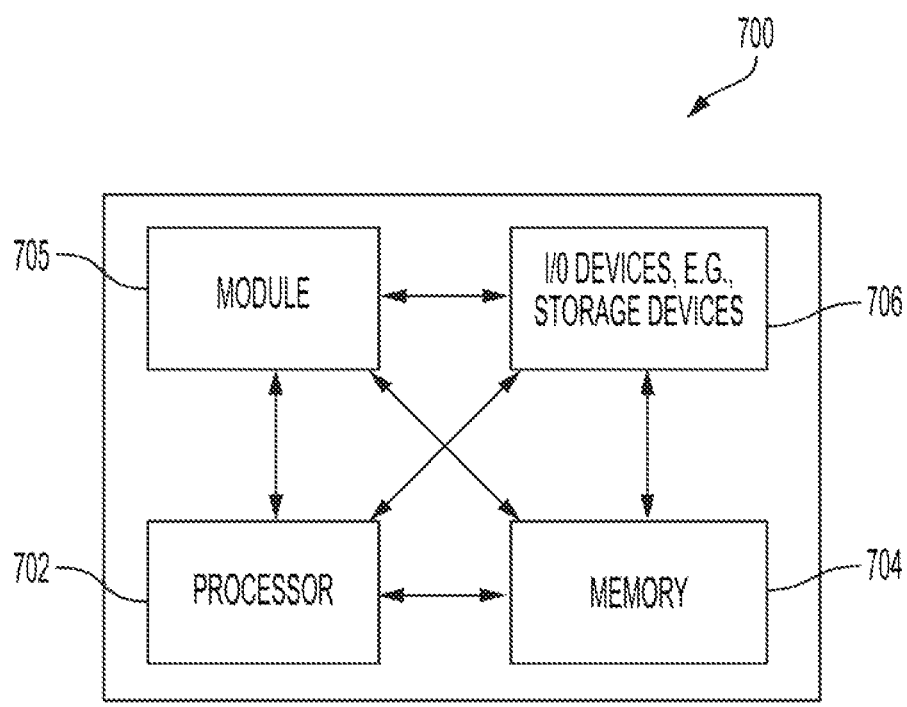
FIG. 7 illustrates a high-level block diagram of an example computer suitable for use in performing the functions described herein.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for performing a grammar-based workflow search on a multi-function device, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for performing a grammar-based workflow search on a multi-function device (e.g., a software program comprising computer-executable instructions) can be loaded into memory 704 and executed by hardware processor element 702 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for performing a grammar-based workflow search on a multi-function device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
receiving, by a processor of a multi-function device (MFD), a grammar-based voice search for a workflow;
processing, by the processor, the grammar-based voice search into normalized terms associated with the MFD;
searching, by the processor, for workflows that match the normalized terms from the grammar-based voice search; and
displaying, by the processor, matching workflows in a sorted order on a user interface of the MFD.

2. The method of claim 1, further comprising:
converting, by the processor, the workflows from a plurality of different formats into a normalized format that uses the normalized terms associated with the MFD.

3. The method of claim 2, wherein the plurality of different formats comprises internet print protocol (IPP), proprietary print driver tickets, and extensible markup language.

4. The method of claim 1, wherein the workflows are stored locally on the MFD.

5. The method of claim 1, wherein the workflows are stored remotely on a server.

6. The method of claim 1, wherein the sorted order is based on a frequency of use of the matching workflows.

7. The method of claim 6, wherein the sorted order is based on a user identification of a user who is logged into the MFD.

8. The method of claim 1, further comprising:
receiving, by the processor, additional grammar-based voice search terms;
processing, by the processor, the additional grammar-based voice search terms into additional normalized terms associated with the MFD;
searching, by the processor, the matching workflows that match the additional normalized terms from the additional grammar-based voice search terms; and
displaying, by the processor, a reduced number of matching workflows in the sorted order on the user interface of the MFD.

9. The method of claim 8, wherein the receiving the additional grammar-based voice search terms, the processing the additional grammar-based voice search terms, the searching the matching workflows, and the displaying the reduced number of matching workflows is repeated until a single matching workflow is displayed.

10. A non-transitory computer-readable medium storing a plurality of instructions, which when executed by a processor of a multi-function device (MFD), causes the processor to perform operations, comprising:
receiving a grammar-based voice search for a workflow;
processing the grammar-based voice search into normalized terms associated with the MFD;
searching for workflows that match the normalized terms from the grammar-based voice search; and
displaying matching workflows in a sorted order on a user interface of the MFD.

11. The non-transitory computer-readable medium of claim 10, further comprising:
converting the workflows from a plurality of different formats into a normalized format that uses the normalized terms associated with the MFD.

12. The non-transitory computer-readable medium of claim 11, wherein the plurality of different formats comprises internet print protocol (IPP), proprietary print driver tickets, and extensible markup language.

13. The non-transitory computer-readable medium of claim 10, wherein the workflows are stored locally on the MFD.

14. The non-transitory computer-readable medium of claim 10, wherein the workflows are stored remotely on a server.

15. The non-transitory computer-readable medium of claim 10, wherein the sorted order is based on a frequency of use of the matching workflows.

16. The non-transitory computer-readable medium of claim 15, wherein the sorted order is based on a user identification that is logged into the MFD.

17. The non-transitory computer-readable medium of claim 10, further comprising:
receiving additional grammar-based voice search terms;
processing the additional grammar-based voice search terms into additional normalized terms associated with the MFD;
searching the matching workflows that match the additional normalized terms from the additional grammar-based voice search terms; and
displaying a reduced number of matching workflows in the sorted order on the user interface of the MFD.

18. The non-transitory computer-readable medium of claim 17, wherein the receiving the additional grammar-based voice search terms, the processing the additional grammar-based voice search terms, the searching the matching workflows, and the displaying the reduced number of matching workflows is repeated until a single matching workflow is displayed.

19. A method, comprising:
converting, by a processor of a multi-function device, workflows into files that use parameters in a normalized grammar;
receiving, by a processor of a multi-function device (MFD), a grammar-based voice search for a workflow;
processing, by the processor, the grammar-based voice search to detect words associated with parameters of the MFD;
converting, by the processor, the words associated with parameters of the MFD into a normalized terms associated with the MFD;
searching, by the processor, the files to find workflows that match the normalized terms from the grammar-based voice search; and
displaying, by the processor, matching workflows in a sorted order on a user interface of the MFD.

20. The method of claim 19, further comprising:
repeating the receiving, the processing, the converting, the searching, and the displaying with subsequent grammar-based voice search terms until a single matching workflow is found and displayed.

* * * * *